United States Patent

Kuehn

[15] 3,700,739
[45] Oct. 24, 1972

[54] FLAME RETARDANT COMPOSITIONS

[72] Inventor: Erich Kuehn, Wilmington, Del.

[73] Assignee: Atlas Chemical Industries, Inc., Wilmington, Del.

[22] Filed: Feb. 19, 1971

[21] Appl. No.: 117,038

Related U.S. Application Data

[62] Division of Ser. No. 728,913, May 14, 1968, Pat. No. 3,644,599.

[52] U.S. Cl. .......260/613 R, 260/77.5 AR, 252/182, 260/953
[51] Int. Cl. .............................................C07c 43/28
[58] Field of Search ..................................260/613 R

[56] References Cited

UNITED STATES PATENTS

| | | | |
|---|---|---|---|
| 2,571,217 | 10/1951 | Davis et al. | .............260/613 R |
| 3,162,615 | 12/1964 | Bremmer | ...........260/613 R X |

FOREIGN PATENTS OR APPLICATIONS 689,135   6/1964   Canada........................613 R

*Primary Examiner*—Bernard Helfin
*Attorney*—Kenneth E. Mulford et al.

[57] ABSTRACT

Polyol adjuvants are provided which have the property of imparting flame-retardant characteristics to polyurethane foams. The adjuvants are prepared by condensing at least one mole of 3-halo-1,2-propanediol and at least one mole of 1,3-dihalo-2-propanol with a tetrahalo bisphenol A or, alternatively, with the reaction product of at least one mole of a phenol, a chlorophenol and at least one mole of the same or another phenol with at least one mole of formaldehyde. The condensation products are subsequently reacted with the salt of a saturated or unsaturated partial ester of phosphoric acid and optionally brominated in the latter case. Flame-retardant polyurethane foams are disclosed containing the novel polyol adjuvants.

9 Claims, No Drawings

FLAME RETARDANT COMPOSITIONS

This is a division of application Ser. No. 728,913, filed May 14, 1968 and now U.S. Pat. No. 3,644,599.

This invention relates to new flame-retardant polyurethane compositions. More particularly, this invention relates to novel flame retardant polyurethane foams, to novel flame-retardant components incorporated into such foams and to methods of producing such flame-retardant foams and components thereof.

It is an object of this invention to provide novel fire-retardant adjuvants for polyurethane foams.

It is another object of this invention to provide new polyurethane compositions having superior flame-retardant properties.

It is another object of the present invention to provide methods for the production of polyurethane foam compositions containing novel flame-retardant adjuvants and for the preparation of such adjuvants themselves.

The foregoing objects and still further objects of the invention are broadly achieved according to the present invention by providing novel polyhydric compounds useful in the preparation of polyurethane foam compositions to impart flame-resistance thereto which may be characterized by the following generalized formulas:

(2)

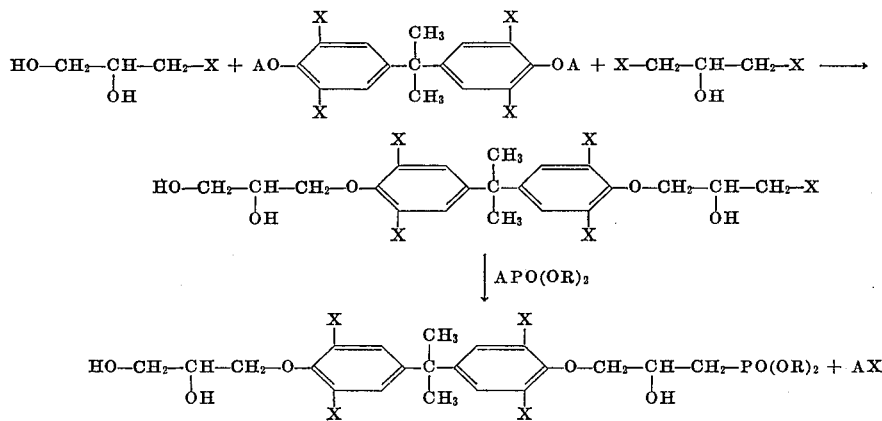

wherein $n$ is an integer from 0 to 2, wherein at least one X is a halogen atom having an atomic weight greater than 30 and the remaining X's are selected from the group consisting of a hydrogen atom, a halogen having an atomic weight greater than 30 and an alkyl radical having from one to nine carbon atoms and wherein at least one Y is a hydroxyl radical, at least one Y is the radical $-PO(OR)_2$ and the remaining Y's are selected from the group consisting of a hydroxyl radical and the radical $-PO(OR)_2$ in which R is a member of the group consisting of an alkyl radical containing from one to four carbon atoms, an alkenyl radical containing from two to four carbon atoms and a haloalkyl radical containing from two to four carbon atoms and from one to two halogen atoms having an atomic weight greater

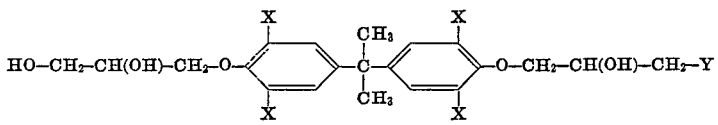

wherein X is a member of the group consisting of a halogen atom having an atomic weight greater than 30, and wherein Y' is a member of the group consisting of a halogen atom having an atom weight greater than 30 and the radical $-PO(OR)_2$ in which R is selected from the group consisting of an alkyl radical containing from one to four carbon atoms, an alkenyl radical containing from two to four carbon atoms and a haloalkyl radical containing from two to four carbon atoms and from one to two halogen atoms having an atomic weight greater than 30, and than 30.

Broadly in accordance with this invention the flame-retardant polyol adjuvants characterized by formula (1) above may be prepared by the reaction in equimolar proportions of a disodium tetrahalo bisphenol A, 3-halo-1,2-propanediol and 1,3-dihalo-2-propanol within a temperature range of about 70° C. to about 200° C. and subsequent reaction of the resulting product with a suitable alkali metal salt of a partial ester of phosphorous acid within the same temperature range. The reaction may be represented as follows:

wherein A is an alkali metal and the remaining generalized symbols are as defined in formula (1) above.

The final product may be halogenated in those instances in which an ester of phosphorous acid containing an olefinic linkage has been used. Halogenation is accomplished at temperatures below about 70° C., preferably from about 0° C. to about 30° C.

Representative esters of phosphorous acid which may be used are dimethyl phosphite, diethyl and triethyl phosphite, dibutyl phosphite, trivinyl phosphite, triallyl phosphite and others. Tetrabromo bisphenol A and tetrachlorobisphenol A are typically representative of the tetrahalobisphenol A which may be used. The tetraiodo derivative may also be employed, but tetrabromobisphenol A is preferred. 3-chloro-1,2-propanediol and 1,3-dichloro-2-propanol are preferred alcohols for use in preparation of the polyol adjuvants of this invention, but the bromo and iodo derivatives may also be used.

The following are typical examples of the polyol adjuvants subsumed under formula (1) set forth above and useful to impart flame-retardant characteristics to polyurethane foams:

(a) 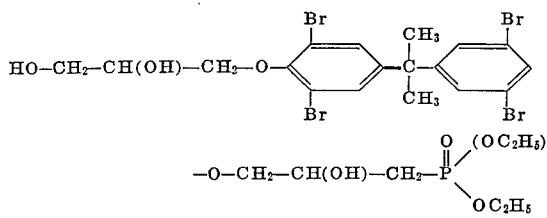

(b) 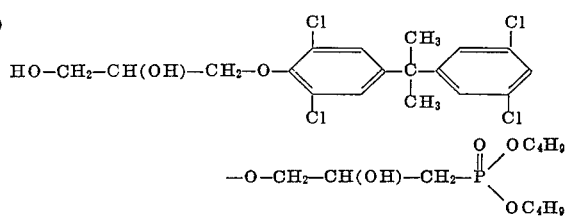

(c) 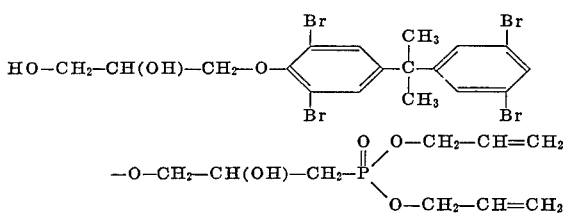

(d) 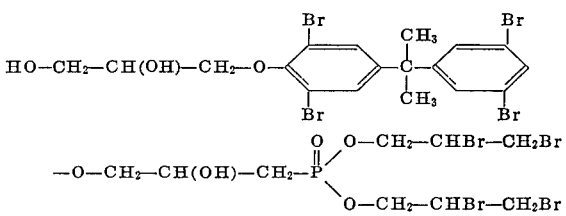

(e) 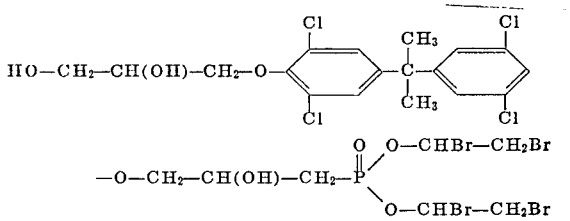

(f) 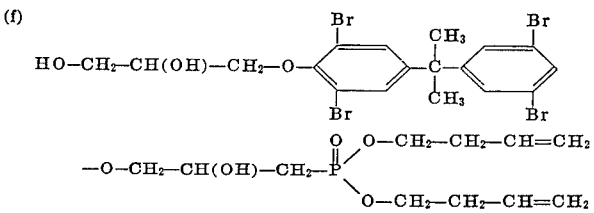

The following are representative examples of the preparation of compounds characterized by formula (1) set forth above:

EXAMPLE 1

18.4 grams of sodium are dissolved in 400 grams of butanol in a 1000 ml. 3-neck flask equipped with stirrer, reflux condenser, thermometer, drop funnel and, optionally, with a nitrogen inlet. The sodium is dissolved under reflux (100° C. – 120° C.) and then 217.5 grams of tetrabromobisphenol A are added. The resulting mixture is refluxed (100° – 120° C.) for about 1 hour with good stirring. The di-sodium salt of tetrabromobisphenol A may also be prepared from equivalent amounts of aqueous NaOH. The use of sodium metal eliminates the necessity of removing the water from the reaction kettle. Thereafter, to the resulting di-sodium salt of tetrabromobisphenol A within a period of ten minutes are added dropwise from the dropping funnel 44.2 grams of 3-chloro-1,2-propanediol. The mixture is refluxed (100° – 120° C.) for about 1 hour, whereupon the milky white solution tends to become clearer and sodium chloride starts settling out of the solution. Within a period of 10 minutes are then added dropwise from the dropping funnel 51.6 grams of 1,3-dichloro-2-propanol and the mixture is again refluxed (100° C. – 120° C.) for about 1 hour with stirring. The reaction upon addition of both 1,3-dichloro-2-propanol and 3-chloro-1,2-propanediol is exothermic and NaCl precipitates indicating that the etherific condensation is taking place. The resulting ether need not be isolated.

In a second flask the sodium salt of diethylphosphite is prepared by dissolving 9.2 grams of sodium in 200 grams of butanol under reflux (100° C. – 120° C.) and then adding 55.2 grams of diethylphosphite and refluxing (100° C. – 120° C.) the mixture for about 1 hour. The resulting solution is then added within a period of 10 minutes dropwise from the dropping funnel to the etheric product contained in the first flask. The reaction is exothermic. Refluxing at the same temperature is continued for about 3 hours and the mixture is then cooled to room temperature. The solution is transferred to a separatory funnel and washed with copious amounts of distilled water to remove all NaCl. The top organic layer of liquid contains the desired product which is obtained in 92 percent yield after stripping off the butanol under an aspirator vacuum. The final product conforms in its chemical structure with the formula of example (a) above.

EXAMPLE 2

The intermediate etherific condensation product prepared as described in the first paragraph of Example 1 is isolated and 327 grams of the dry clean product are mixed with 66.4 grams of triethylphosphite. This mixture is slowly heated with stirring to 145° C. – 150° C. until ethyl chloride is given off. When elimination of ethyl chloride is complete, the product is cooled and is ready for use as an adjuvant in polyurethane foams. The final product, which conforms in its chemical structure with the formula of example (a) above, may also be prepared by carrying out the reaction between the etheric intermediate and trialkyl phosphite in inert solvents having boiling points greater than 150° C.

EXAMPLE 3

327 grams of the isolated, clean, dry intermediate condensation product prepared as described in the first paragraph of Example 1 are dissolved in 400 grams of naphthalene 1,2,3,4-tetrahydride and then 80.8 grams of triallyl phosphite are added. The mixture is heated with stirring to 150° C., at which point allyl chloride is given off. When the elimination of allyl chloride has been completed, the solution is heated under vacuum and the naphthalene 1,2,3,4-tetrahydride is stripped off. The final product, which conforms in its chemical structure to the formula of example (c) above, is then ready for use as an adjuvant in polyurethane foam.

EXAMPLE 4

The reaction of Example 3 is carried out as described but after the complete elimination of allyl chloride, the solution is cooled with ice-water and from a dropping funnel bromine is added dropwise until bromination of the product is complete (when reddish brown color of bromine no longer disappears even upon heating to 80° C.). After bromination, the naphthalene 1,2,3,4-tetrahydride is removed under vacuum and the final product, which conforms in its chemical structure with the formula of example (d) above, is ready for use in the preparation of flame-retardant polyurethane foam.

In general, the polyhydric adjuvants for polyurethane foam compositions characterized by formula (2) set forth above may be prepared in accordance with this invention by the reaction of halogenated phenols, of halogenated phenols and phenols, of halogenated phenols and alkyl phenols and of halogenated phenols with mixtures of phenols and p-alkyl phenols with formaldehyde in suitable proportion to form methylenically linked phenolic groups of the above stated character providing a compound having at least one chlorinated phenolic moiety. The polynuclear phenolic intermediate compounds formed by the reaction of the phenols and formaldehyde as characterized above may contain as few as two aromatic rings or as many as four, depending upon the character and type of polyurethane adjuvant desired. The second step in the synthesis of the polyhydric polyurethane adjuvant employs the reaction of the alkali metal derivatives of the methylenically linked polyphenolic intermediate with a suitable quantity of 3-halo-1,2 propanediol to react with at least one and not more than 3 of the phenolic hydroxyl groups of the aforesaid intermediate. The third step of the synthesis involves the reaction of 1,3-dihalo-2-propanol with the remaining phenolic hydroxyl groups of the methylenically linked intermediate. The resulting product is then in turn reacted with an alkali metal salt of a partial ester of phosphorous acid to obtain a final product. The final product obtained, however, may be halogenated in those instances in which an ester of phosphorous acid containing an olefinic linkage has been used. The phosphorous acid esters may be any of those used to form the class of adjuvants subsumed under formula (1) above and described in connection therewith.

The reaction may be represented as follows:

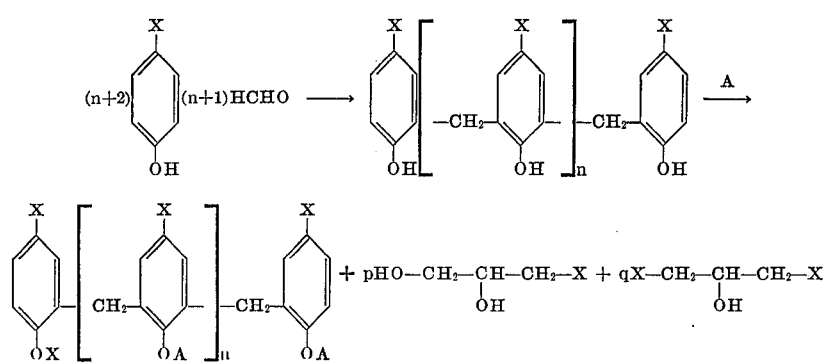

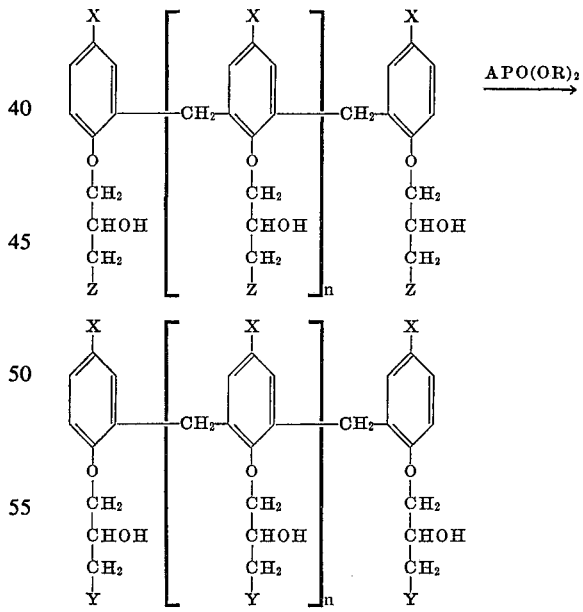

wherein A is an alkali metal, $p$ and $q$ are numbers from one to three having a sum not less than two or more than four, Z is selected from the group consisting of hydroxyl radicals and halogen atoms having an atomic weight greater than 30 and the remaining generalized symbols are the same as those of formula (2) above.

The following are typical examples of the polyol adjuvants of the present invention characterized by formula (2) above:

(g) 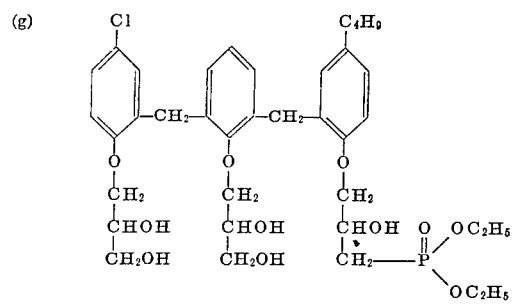
(k) 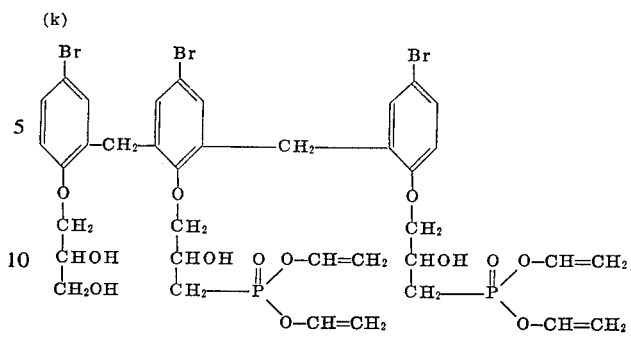
(h) 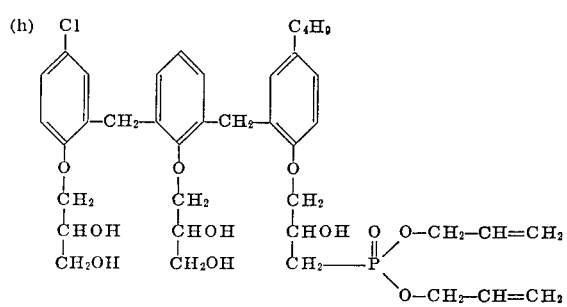
(l) 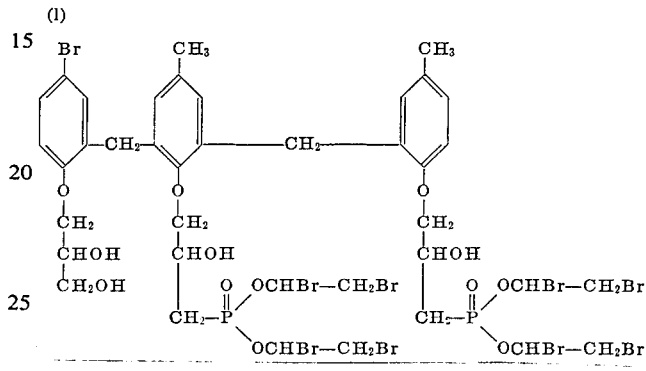
(i) 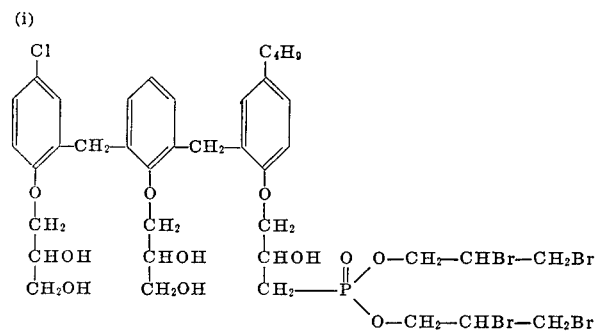
(m) 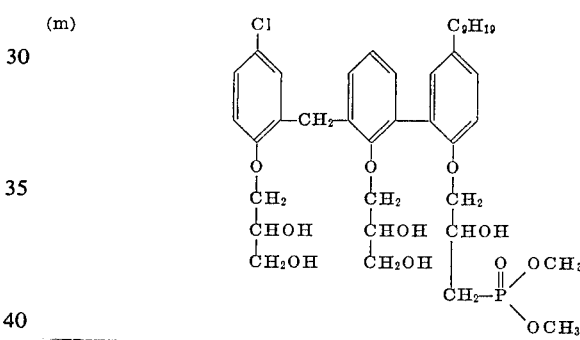
(j) 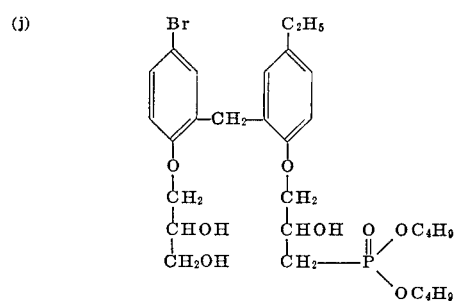
(n) 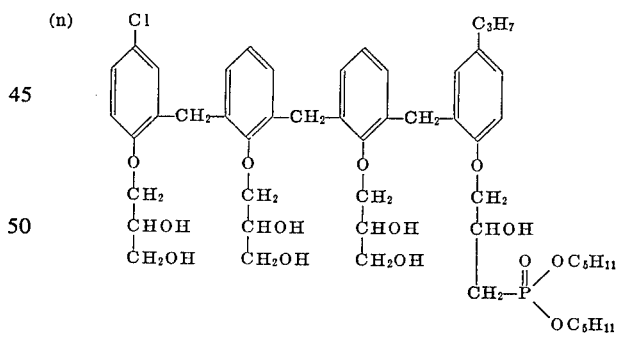
(o) 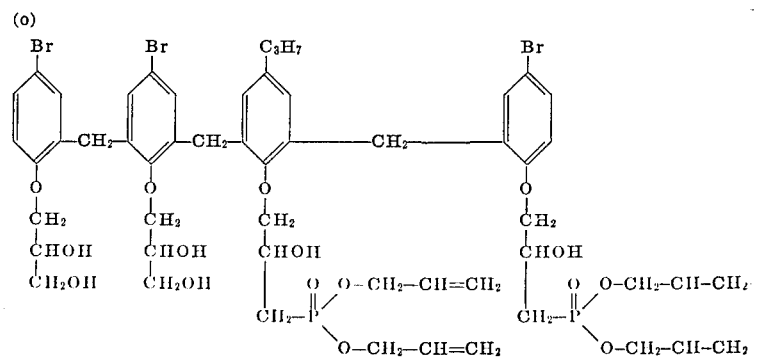

(p)

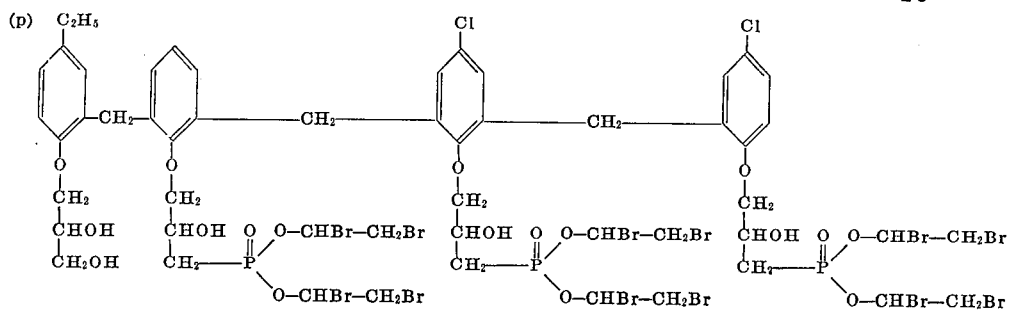

The following are representative examples of the preparation of compounds characterized by formula (2) above:

EXAMPLE 5

In a 3-neck, round bottom 1000 ml. flask equipped with stirrer, reflux condenser, nitrogen inlet, water trap and thermometer are dissolved 60 grams of sodium hydroxide in 150 grams of water. To the alkaline solution are added 121.5 grams of a 37 % solution of formaldehyde in water, 75 grams of toluol, 300 grams of butanol, 64.28 grams of p-chlorophenol, 75.10 grams of p-t-butyl phenol, and 47.05 grams of phenol. The mixture is heated under reflux and water trap until the stoichiometric amount of water is obtained (a total of 253.5 ml. of water is collected — 150 ml. used to dissolve NaOH, 76.5 ml. from the formaldehyde solution and 27 ml. of water of reaction). Within a period of 10 minutes are added dropwise from a dropping funnel 110.5 grams of 3-chloro-1,2-propanediol and the mixture refluxed for a period of about 1 hour. After the required refluxing there are then added within a period of 10 minutes 64.5 grams of 1,3-dichloro-2-propanol and the mixture is again refluxed for about 1 hour to complete the condensation.

In a second flask, sodium diethylphosphite is prepared by reaction of 11.5 grams of sodium in 150 grams of butanol and 69 grams of diethylphosphite. The resulting solution is then added within a period of ten minutes to the first or main reaction vessel and the resulting mixture refluxed for about 3 hours. The reaction mixture is then cooled, sodium chloride removed by filtration or by washing with water and finally solvents are removed, as by stripping them off under vacuum. The resultant final product may be used in the form obtained as an adjuvant in polyurethane foams. The final product conforms in its chemical structure to that of the formula of example (g).

EXAMPLE 6

A methylenically linked intermediate is prepared as described in the first paragraph of Example 5. Subsequently, sodium chloride is removed and the intermediate is obtained dry and clean. 281 grams of the intermediate are then dissolved in 300 grams of naphthalene 1,2,3,4-tetrahydride and the stoichiometric amount (55.2 grams) of triethylphosphite is added. The reaction mixture is heated to 150° C. until all ethyl chloride has been obtained. Thereafter, the naphthalene 1,2,3,4-tetrahydride is removed under vacuum and the final polyol product, which conforms in its chemical structure with the formula of example (g) above, is available for use in polyurethane foams.

EXAMPLE 7

An intermediate is prepared as described in the first paragraph of Example 5. After the intermediate has been freed from sodium chloride and butanol/toluol blend, the stoichiometric amount (80.8 grams) of triallylphosphite is added to the intermediate together with 300 grams of naphthalene 1,2,3,4-tetrahydride and the reaction mixture heated to 150° C. until all allyl chloride is obtained. Finally, the solvent is stripped off under vacuum. The final product conforms in its chemical structure with the formula of example (h) above.

EXAMPLE 8

The reaction of Example 7 is carried out but after the elimination of allyl chloride, the mixture is cooled in an ice-water bath and bromine is added from a dropping funnel until bromination is complete as shown by the fact that the reddish brown color of bromine disappears in solution even when heated to 80° C. Solvent is stripped from the brominated product under vacuum. The final product conforms in its chemical structure with that of the formula of example (i) above.

In accordance with the present invention the above described polyol adjuvants may be used to prepare any kind of polyurethane foams, i.e., foams or cellular compositions comprising multiple urethane linkages formed by the reaction of an isocyanate and a compound containing a hydrogen atom or atoms reactive therewith as, for example, hydroxyl-bearing compounds such as polyesters and polyethers having terminal hydroxyl groups.

Suitable polyesters useful in the preparation of polyurethane foams in accordance with this invention may be obtained by esterification condensation reaction of an aliphatic dibasic carboxylic acid with a glycol or triol or mixture thereof in such proportion that the resultant polyesters possess predominately terminal hydroxyl groups. Aliphatic dibasic carboxylic acids which may be used to prepare such polyesters comprise adipic acid, fumaric acid, sebacic acid, phthalic acid, and maleic acid, for example, and suitable alcohols include ethylene glycol, diethylene glycol, trimethylol propane and the like.

Fatty acid glycerides may be used as the hydroxyl-bearing component in the preparation of the polyurethane foams of the present invention and comprise those having a hydroxyl number of at least about 50 such as caster oils, hydrogenated castor oils or blown natural oils.

Polyesters generally which may be used in the practice of the present invention are described and their method of preparation disclosed in U. S. Pat. Nos.

2,453,644; 2,593,787; 2,409,633; 2,443,735; 2,443,741; 2,450,552; 2,255,313; 2,512,410; 2,634,251; 2,662,069 and 2,662,070, all hereby incorporated by reference.

Polyether hydroxyl-bearing compounds which may be used to prepare polyurethane foam compositions in accordance with this invention comprise those having a functionality of two or more, i.e., polyethers which are diols, triols, tetrols, pentols and hexitols. Particularly suitable polyethers are polyoxyalkylene ethers of polyhydric alcohols or amines such as polyoxyalkylene glycols, polyoxyalkylene bisphenol A, polyoxyalkylene sorbitol, polyoxyalkylene methyl glucoside, polyoxyalkylene pentaerithritol, polyoxyalkylene sucrose, polyoxyalkylene trimethylolethane, polyoxyalkylene trimethylolpropane, polyoxyalkylene diethylene triamine, polyoxyalkylene glycerine. The polyoxyalkylene ether of the polyhydric alcohol may be prepared, if desired, by reacting an alkylene oxide compound with a selected polyhydric alcohol in the conventional manner. The overall range of alkylene oxide groups per molecule may vary within a range of about two to about 80 and the alkylene oxides which may be used comprise ethylene oxide, propylene oxide, butylene oxide and others.

More specifically, among the hydroxyl-bearing compounds which may suitably be used to prepare polyurethane foam in accordance with this invention are polyoxyalkylene bisphenol A containing from two to 20 oxyalkylene groups per molecule and including the polyoxyethylene, polyoxypropylene and polyoxybutylene derivatives; 1,2,6-hexanetriol; dipropylene glycol; propylene glycol; ethylene glycol; polyoxyethylene(2)cyclohexane dimethanol; polypropylene glycol (M.W. 1000); glycerine; trimethylol propane; polyoxypropylene(40)sorbitol; polyoxyethylene(20)methyl glucoside; polyoxypropylene(40)isosorbide as well as many other polyhydric alcohols indicated, for example, in U. S. Pat. No. 2,843,568, hereby incorporated by reference. Accordingly, aromatic, aliphatic and cyclo-aliphatic hydroxy compounds may be utilized in the preparation of a polyurethane foam. Ethylene oxide, propylene oxide and butylene oxide derivatives of such polyhydric alcohols may be used, as well as hydroxyl terminated polyesters derived from saturated or unsaturated dicarboxylic acids, simple glycols and modifying trihydric alcohols. In many cases it will be desirable to use two or more polyhydric alcohols in combination to produce a polyurethane foam having the characteristics desired. Glycols having hydroxyl numbers within the range of 1000 to 2000, such as ethylene glycol or diethylene glycol are particularly useful in this connection.

A wide variety of organic isocyanate compounds may be used to prepare the novel polyurethane foam compositions among which are included toluene diisocyanate, diphenyl diisocyanate, triphenyl diisocyanate, chloro-phenyl-2,4-diisocyanate, ethylene diisocyanate, 1,4-tetramethylene diisocyanate, p-phenylene diisocyanate, hexamethylene diisocyanate, 3,3'-dimethyl-4,4'-biphenylene diisocyanate, 3,3'-dimethoxy-4,4'biphenylene diisocyanate, polymethylene polyphenyl polyisocyanate (PAPI), diphenylmethane-4,4'-diisocyanate and others.

In general, polyurethane foams of the present invention are prepared by reacting a hydroxyl-bearing component as described above with an organic isocyanate as described above in suitable proportion to provide a ratio of hydroxyl groups to isocyanate groups within a range of about 1/0.9 to about 1/1.7 with a ratio of about 1/1.05 preferred.

Catalysts which may be used in the preparation of polyurethane foams of the present invention may comprise amine catalysts and tin catalysts or mixtures thereof. Among the suitable amine catalysts are N-alkyl morpholines such as N-methyl morpholine and N-ethyl morpholine; tertiary amines such as trimethyl amine, triethyl amine, tetramethyl quanidine, triethylene diamine, N,N,N',N'-tetramethyl-1,3-butane diamine; piperazine and piperazine derivatives such as N-methyl piperazine. These amines may be present in amounts from about 0.05 percent to about 2 percent by weight of the hydroxy-bearing compounds reacted with the isocyanate compound. Among the suitable tin catalysts are included dialkyl tin laurates, such as dibutyl tin dilaurate, dibutyl tin di-2-ethyl hexoate, dibutyl tin diacetate, stannous oleate and stannous octoate. Tin catalysts may be present in amounts from about 0.1 percent to about 1.0 percent by weight of the hydroxyl-bearing compounds used in the reaction.

Examples of useful surface active agents which can be present in amounts of from about 0.05 percent to about 2 percent by weight of the hydroxy-bearing compounds used to prepare the polyurethane foams are water-soluble siloxane-oxyalkylene block copolymers as described in U. S. Pat. No. 2,834,748 to Bailey et al., issued May 13, 1958. Other surfactants which may be used are condensates of ethylene oxide with a hydrophobic base formed by condensing propylene oxide with propylene glycol. These surfactants have a molecular weight within the range of about 2000 to about 8000 and are generally ascribed the formula $HO(C_2H_4O)_a(C_3H_6O)_b(C_2H_4O)_cH$. Another class of surfactants comprises alkylene oxide adducts of ethylene diamine having generally the formula:

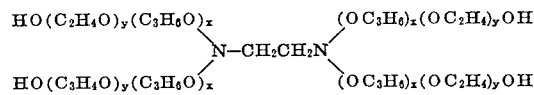

Still another class of surfactants comprise the polyoxyalkylene esters of long chain fatty acids and sorbitan such as polyoxyethylene(20)sorbitan monolaurate, polyoxyethylen(4)sorbitan monolaurate, polyoxyethylene(20)sorbitan tristearate, polyoxyethylene(20)sorbitan monooleate, polyoxyethylene(5)sorbitan monooleate and polyoxyethylene(20)sorbitan trioleate.

Although the polyurethane foams of this invention may use water as a foaming agent, a halogenated saturated aliphatic hydrocarbon or a mixture of such halogenated saturated aliphatic hydrocarbons is preferred, for example, trichlorofluoromethane (Freon 11); monochloroethane; monochloromonofluoroethane; 1,2-dibromo, 1,1,2,2-tetrafluoroethane; 1,1,2-trichloro 1,2,2-trifluoroethane, 1,1,2,2-tetrafluoro 1,2-dichloroethane; 1,2-difluoro-1,1,2,2-tetrachloroethane; dichloromethane; dibromomethane and their mixtures. These materials may be present in nearly trace amounts up to about 20% by weight of the hydroxyl-bearing compound, as desired.

In general, polyurethane foams of the present invention may be prepared by reacting a hydroxyl-bearing component which includes a hydroxyl bearing compound of the type hereinbefore described, usually a polyester or a polyether and from about 5 percent to about 50 percent of a polyol flame-retarding adjuvant as described above based upon the total weight of the hydroxyl bearing component. A hydroxyl bearing component containing from about 5 percent to about 50 percent by weight of a flame-retarding polyol adjuvant of this invention will produce a self-extinguishing polyurethane foam (when appropriately reacted with an organic isocyanate) meeting the specifications for self-extinguishing plastic materials set forth in the Standard Method of Test for Flammability of Rigid Plastics over 0.127 cm (0.050 in.) in Thickness of the American Society for Testing of Materials, ASTM Designation: D-1692 -59T Issued 1959. A hydroxyl-bearing component containing from about 15 percent to about 50 percent by weight of a flame-retarding polyol adjuvant of this invention will, when reacted with an appropriate organic isocyanate, produce a non-burning polyurethane foam composition meeting the specifications set forth in the above-cited ASTM test.

The following are representatives examples of the preparation of flame-retardant polyurethane foams in accordance with this invention:

EXAMPLE 9

FORMULATION

| Component A | % by Weight |
| --- | --- |
| Polymethylene polyphenyl isocyanate (PAPI) | 42.2 |
| Component B | |
| Ethylene glycol | 3.1 |
| Polyoxyethylene(10)sorbitol | 23.2 |
| Polyol adjuvant of example (a) | 12.3 |
| Siloxane-oxyalkylene block copolymer surfactant (L-5310 Union Carbide) | 1.0 |
| Dibutyl tin dilaurate | 0.2 |
| Dimethyl ethanol amine | 0.5 |
| Trichlorofluoromethane | 17.5 |

Component B in the above formulation is prepared by adding each of the named ingredients sequentially in the amounts specified while mixing thoroughly with a high speed mixer. To the component B is then added the specified amount of organic isocyanate (Component A) and and the resulting mixture is stirred at high speed for 10 seconds with a high speed mixer, after which it is then poured into a one-gallon paper cup. Within 8 seconds the foam begins to rise and after 100 seconds the foaming is complete. The fine-celled polyurethane foam produced by this procedure will be found to have the following properties determined, unless otherwise indicated, in accordance with Standard Methods of Tests of the American Society for Testing of Materials cited:

Density (ASTM D1622–63) 1.89
Humid Aging at 70° C. and 100 % R.H.*
  1 day +11
  7 days +13
  14 days +18
  28 days +20
Heat Distortion Temperature (°F.)**
  401

Burning Tests (ASTM D1692-59T)
| Seconds | Inches |
| --- | --- |
| −27 | 3/8 |
| −23 | 3/8 |
| −26 | 3/8 |

The physical properties of the polyurethane foam indicate that the flame-retarding aromatic polyol adjuvent imparts very good flame-retardancy to the foam, with a high heat distortion point as well as good humid aging properties.

EXAMPLES 10–16

| Formulation Component A | | | | | | | |
| --- | --- | --- | --- | --- | --- | --- | --- |
| Polymethylene polyphenyl isocyanate | 41.8 | 43.5 | 43.5 | 45.5 | 45.1 | 45.1 | 46.4 |
| Component B | | | | | | | |
| Polyoxyethylene(10)sorbitol | 16.8 | 20.1 | 24.0 | 24.7 | 28.9 | 30.6 | 31.5 |
| Ethylene glycol | 4.2 | 4.1 | 3.2 | 2.7 | 1.9 | 1.5 | 1.8 |
| Polyol adjuvent of example (a) | 20.7 | 16.1 | 12.8 | 10.6 | 7.5 | 6.2 | 3.8 |
| Organo-silicon surfactant (Union Carbide L5310) | 0.6 | 0.6 | 0.6 | 6 | 0.6 | 0.6 | 0.6 |
| Dimethylethanolamine | 0.8 | 0.8 | 0.8 | 0.8 | 0.8 | 0.8 | 0.8 |
| Dibutyl tin dilaurate | 0.1 | 0.1 | 0.1 | 0.1 | 0.1 | 0.1 | 0.1 |
| trichlorofluoromethane | 15.0 | 15.0 | 15.0 | 15.0 | 15.0 | 15.0 | 15.0 |

| Properties | | | | | | | |
| --- | --- | --- | --- | --- | --- | --- | --- |
| Cream Time (Sec.) | 15 | 15 | 19 | 20 | 20 | 21 | 19 |
| Foam Time (Sec.) | 50 | 45 | 44 | 38 | 41 | 45 | 39 |
| Tack Free Time (Sec.) | 64 | 60 | 55 | 45 | 44 | 50 | 48 |
| Burning Test (Sec.) (ASTM-D1692-59T) | −25 | −22 | −20 | −22 | −34 | −59 | −30 |
|  | −26 | −26 | −28 | −22 | −40 | −45 | −45 |
|  | −30 | −30 | −26 | −23 | −39 | −38 | −28 |
|  | −32 | −19 | −29 | −21 | −30 | −47 | −40 |
| Burning Test (Inch) (ASTM-D1692-59T) | 5/8 | 1/4 | 2/4 | 3/4 | 1⅞ | 3½ | 5¾ |
|  | ¾ | ½ | ⅞ | ¾ | 2½ | 3½ | BC |
|  | ¼ | ½ | ½ | ½ | 2½ | 4 | BC |
|  | ¼ | ¼ | ¾ | ¾ | 2 | 4½ | BC |
| Density (ASTM CD-1622-63) | 1.96 | 1.98 | 2.00 | 1.95 | 2.03 | 1.89 | 1.94 |
| Humid Aging* (at 70°C. and 100°R.H.) | | | | | | | |
|   1 day | +16 | +16 | +11 | +15 | +9 | +12 | +19 |
|   7 days | +20 | +12 | +12 | +23 | +18 | +16 | +24 |
|   14 days | +24 | +25 | +12 | +25 | +25 | +20 | +28 |
|   28 days | +29 | +31 | +15 | +33 | +25 | +23 | +29 |
| Heat Distortion Temp. (°F.)** | 376 | 394 | 401 | 386 | 349 | 350 | 356 |

*The values given indicate the percentage of volume change. A positive value indicates volume increase; a negative value, shrinkage.

**Heat Distortion Temperature is the temperature at which a sample of the foamed material exhibits a 20% deformation in shape under a load equal to 1/10 of the compression strength of the material. Compression strength is determined in accordance with ASTM D-21-64.

Polyurethane foams having the formulation and properties tabulated above may be prepared and evaluated in like manner as the polyurethane foam of Example 9.

The following are representative formulations suitable for the production of fire-retardant polyurethane foams according to the method of the present invention as exemplified in Example 9 above.

EXAMPLE 17

| Component A | % by Weight |
| --- | --- |
| Polymethylene polyphenyl isocyanate | 42.2 |
| Component B | |
| Ethylene glycol | 3.1 |
| Polyoxyethylene(10)sorbitol | 23.2 |
| Polyol adjuvant of example (d) | 12.2 |
| Siloxane-oxyalkylene block copolymer surfactant (L5310, Union Carbide) | 1.0 |
| Dibutyl tin dilaurate | 0.2 |
| Dimethyl ethanol amine | 0.5 |
| Trichlorofluoromethane | 17.5 |

EXAMPLE 18

| Component A | % by Weight |
| --- | --- |
| Polymethylene polyphenyl isocyanate | 41.8 |
| Component B | |
| Polyoxyethylene(10)sorbitol | 16.8 |
| Ethylene glycol | 4.2 |
| Polyol adjuvant of example (g) | 20.7 |
| Organo-silicon surfactant (Union Carbide, L5310) | 0.6 |
| Dimethyl ethanol amine | 0.8 |
| Trichlorofluoromethane | 15.0 |
| Dibutyl tin dilaurate | 0.1 |

EXAMPLE 19

| Component A | % by Weight |
| --- | --- |
| Polymethylene polyphenyl isocyanate | 45.5 |
| Component B | |
| Polyoxyethylene(10)sorbitol | 24.7 |
| Ethylene glycol | 2.7 |
| Polyol adjuvant of example (h) | 10.6 |
| Organo-silicon surfactant (Union Carbide, L5310) | 0.6 |
| Dimethyl ethanol amine | 0.8 |
| Dibutyl tin dilaurate | 0.1 |
| Trichlorofluoromethane | 15.0 |

EXAMPLE 20

| Component A | % by Weight |
| --- | --- |
| Polymethylene polyphenyl isocyanate | 43.5 |
| Component B | |
| Polyoxyethylene(10)sorbitol | 24.0 |
| Ethylene glycol | 3.2 |
| Polyol adjuvant of example ( ) | 12.8 |
| Organo-silicon surfactant (Union Carbide, L5310) | 0.6 |
| Dimethyl ethanol amine | 0.8 |
| Dibutyl tin dilaurate | 0.1 |
| Trichlorofluoromethane | 15.0 |

The foams are useful wherever flame-retardant foams of the kind are required in the construction industry, the decorative arts and other applications.

Having thus described my invention, I claim:

1. A compound of the formula:

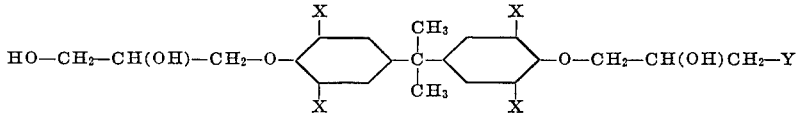

wherein X and Y are members of the group consisting of halogen atoms having an atomic weight greater than 30.

2. A compound of claim 1 wherein X is bromine.
3. A compound of claim 1 wherein X is chlorine.
4. A compound of claim 1 wherein Y is bromine.
5. A compound of claim 1 wherein Y is chlorine.
6. A compound of claim 2 wherein Y is bromine.
7. A compound of claim 2 wherein Y is chlorine.
8. A compound of claim 3 wherein Y is chlorine.
9. A compound of claim 3 wherein Y is bromine.

* * * * *

UNITED STATES PATENT OFFICE
CERTIFICATE OF CORRECTION

Patent No. 3,700,739  Dated October 24, 1972

Inventor(s) Erich Kuehn

It is certified that error appears in the above-identified patent and that said Letters Patent are hereby corrected as shown below:

Formula bridging Columns 5 and 6 should read

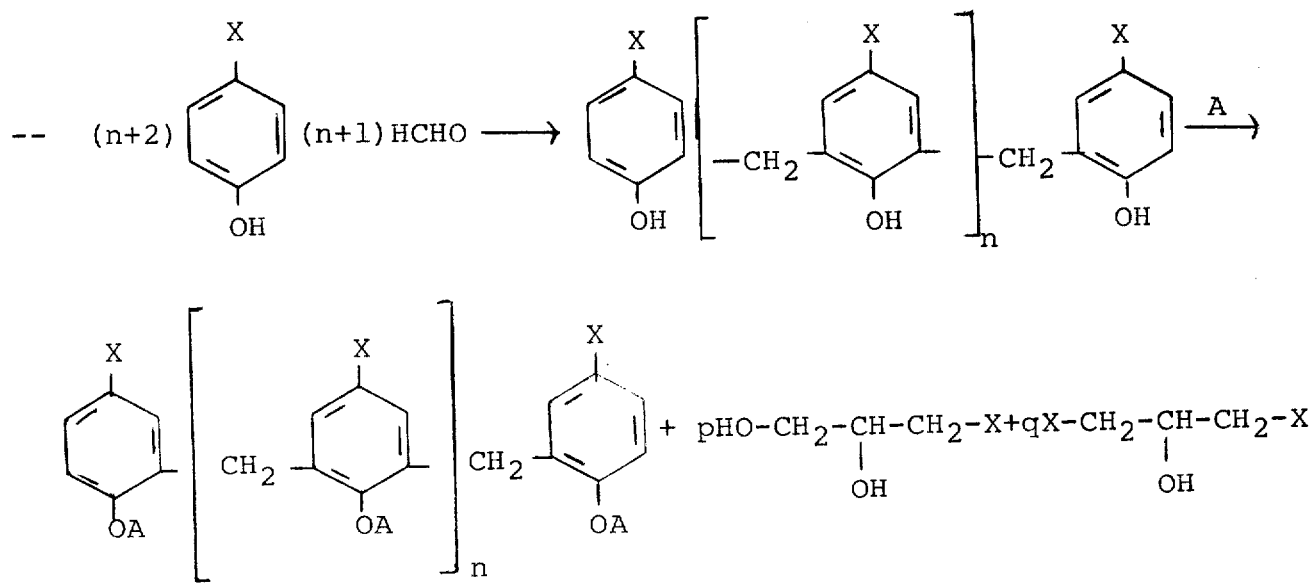

Column 13, line 51, one of the "and"'s should be deleted.

(Continued on Page 2)

UNITED STATES PATENT OFFICE
CERTIFICATE OF CORRECTION

Patent No. 3,700,739　　　　　　　　Dated October 24, 1972

Inventor(s) Erich Kuehn　　　　　　　　　　　　　　　　- 2

It is certified that error appears in the above-identified patent and that said Letters Patent are hereby corrected as shown below:

Page 2

Column 14, lines 12 through 51 (the table entitled "Examples 10-16") should read as follows:

EXAMPLES 10-16

Formulation

| Component A | | | | | | | |
|---|---|---|---|---|---|---|---|
| Polymethylene polyphenyl isocyanate | 41.8 | 43.5 | 43.5 | 45.5 | 45.1 | 45.1 | 46.4 |
| Component B | | | | | | | |
| Polyoxyethylene(10) sorbitol | 16.8 | 20.1 | 24.0 | 24.7 | 28.9 | 30.6 | 31.5 |
| Ethylene glycol | 4.2 | 4.1 | 3.2 | 2.7 | 1.9 | 1.5 | 1.8 |
| Polyol adjuvent of example (a) | 20.7 | 16.1 | 12.8 | 10.6 | 7.5 | 6.2 | 3.8 |
| Organo-silicon surfactant (Union Carbide L5310) | 0.6 | 0.6 | 0.6 | 0.6 | 0.6 | 0.6 | 0.6 |
| Dimethylethanolamine | 0.8 | 0.8 | 0.8 | 0.8 | 0.8 | 0.8 | 0.8 |
| Dibutyl tin dilaurate | 0.1 | 0.1 | 0.1 | 0.1 | 0.1 | 0.1 | 0.1 |
| Trichlorofluoromethane | 15.0 | 15.0 | 15.0 | 15.0 | 15.0 | 15.0 | 15.0 |
| Properties | | | | | | | |
| Cream Time (Sec.) | 15 | 15 | 19 | 20 | 20 | 21 | 19 |
| Foam Time (Sec.) | 50 | 45 | 44 | 38 | 41 | 45 | 39 |
| Tack Free Time (Sec.) | 64 | 60 | 55 | 45 | 44 | 50 | 48 |

(Continued on Page 3)

UNITED STATES PATENT OFFICE

CERTIFICATE OF CORRECTION

Patent No. 3,700,739  Dated October 24, 1972

Inventor(s) Erich Kuehn

It is certified that error appears in the above-identified patent and that said Letters Patent are hereby corrected as shown below:

Page 3

| | | | | | | | |
|---|---|---|---|---|---|---|---|
| Burning Test (Sec.) (ASTM-D1692-59T) | -25 | -22 | -20 | -22 | -34 | -59 | -30 |
| | -26 | -26 | -28 | -22 | -40 | -45 | -45 |
| | -30 | -30 | -26 | -23 | -39 | -38 | -28 |
| | -32 | -19 | -29 | -21 | -30 | -47 | -40 |
| Burning Test (Inch) (ASTM-D1692-59T) | 5/8 | 1/4 | 2/4 | 3/4 | 1 7/8 | 3 1/2 | 5 3/4 |
| | 3/4 | 1/2 | 7/8 | 3/4 | 2 1/2 | 3 1/2 | BC |
| | 1/4 | 5/8 | 1/2 | 1/2 | 2 1/2 | 4 | BC |
| | 1/4 | 1/4 | 3/4 | 3/4 | 2 | 4 1/2 | BC |
| Density | 1.96 | 1.98 | 2.00 | 1.95 | 2.03 | 1.89 | 1.94 |
| (ASTM CD-1622-63) Humid Aging* (at 70°C. and 100°R.H.) | | | | | | | |
| 1 day | +16 | +16 | +11 | +15 | +9 | +12 | +19 |
| 7 days | +20 | +12 | +12 | +23 | +18 | +16 | +24 |
| 14 days | +24 | +25 | +12 | +25 | +25 | +20 | +28 |
| 28 days | +29 | +31 | +15 | +33 | +25 | +23 | +29 |
| Heat Distortion Temp. (°F.)** | 376 | 394 | 401 | 386 | 349 | 350 | 356 |

Column 15, line 3, the words "Component B" should be underlined so as to indicate a heading.

Column 15, line 17, the words "Component B" should be underlined so as to indicate a heading.

(Continued on Page 4)

UNITED STATES PATENT OFFICE
CERTIFICATE OF CORRECTION

Patent No. 3,700,739      Dated October 24, 1972

Inventor(s) Erich Kuehn

It is certified that error appears in the above-identified patent and that said Letters Patent are hereby corrected as shown below:

Page 4

Column 15, line 35, the words "Component B" should be underlined so as to indicate a heading.

Column 16, line 7, the words "Component B" should be underlined so as to indicate a heading.

Signed and sealed this 8th day of May 1973.

(SEAL)
Attest:

EDWARD M. FLETCHER, JR.
Attesting Officer

ROBERT GOTTSCHALK
Commissioner of Patents